(12) United States Patent
Yang et al.

(10) Patent No.: US 7,185,009 B2
(45) Date of Patent: Feb. 27, 2007

(54) IC FOUNDRY MANUFACTURING TECHNOLOGY MASTER DATA MANAGEMENT STRUCTURE

(75) Inventors: Hwa-Yu Yang, Dashu Shiang (TW); Shu-Ling Feng, Hsinchu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 412 days.

(21) Appl. No.: 10/403,875

(22) Filed: Mar. 31, 2003

(65) Prior Publication Data

US 2004/0193623 A1    Sep. 30, 2004

(51) Int. Cl.
*G06F 17/30* (2006.01)
(52) U.S. Cl. .............. 707/6; 705/11; 430/5; 430/311; 707/100
(58) Field of Classification Search .............. 700/100; 707/100, 6; 705/11; 430/5, 311
See application file for complete search history.

(56) References Cited

U.S. PATENT DOCUMENTS

| | | | |
|---|---|---|---|
| 5,654,811 A * | 8/1997 | Spitzer et al. .............. 349/106 |
| 5,930,764 A * | 7/1999 | Melchione et al. ........... 705/10 |
| 6,221,538 B1 * | 4/2001 | Kerszykowski et al. ....... 430/5 |
| 6,336,056 B1 * | 1/2002 | Fujimoto et al. ........... 700/121 |
| 6,405,204 B1 * | 6/2002 | Baker et al. .............. 705/36 R |
| 6,430,572 B1 * | 8/2002 | Steffan et al. ........... 707/104.1 |
| 6,893,799 B2 * | 5/2005 | Danovitch et al. .......... 430/311 |

OTHER PUBLICATIONS

Waybackmachine: Silicon Valley Microelectronics, Inc.; http://web.archive.org/web/20020121134758/http://svmi.com/; 4 pages.*

* cited by examiner

*Primary Examiner*—Jeffrey Gaffin
*Assistant Examiner*—Monica Pyo
(74) *Attorney, Agent, or Firm*—Duane Morris LLP

(57) ABSTRACT

A method for managing data in a database includes the steps of: classifying a plurality of data in the database based on a technology type of each datum, the data in the database describing semiconductor products and semiconductor fabrication techniques; classifying the data within each technology type based on a device type of each datum; and classifying the data within each device type based on at least one processing attribute associated with the datum.

31 Claims, 12 Drawing Sheets

| | | | | | |
|---|---|---|---|---|---|
| Technology Information Query From | | | | | |
| Exit | | | | | |
| Technology Information Query | | | | | |
| o Technology Level 1 Query | | o Technology Level 5 Query | | | |
| o Technology Level 2 Query | | o Loop Test Query | | | |
| ⊚ Technology Level 3 Query 510 | | o Color Filter Query | | | |
| o Technology Level 4 Query | | o Bumping Query | | | |
| o Masking Layers and Bias Information Query | | o Technology Function Query | | | |
| Geometry (um/nm) 013/0.13UM  Tech. Level 3 Code ▽ —514 | | | | | |
| Technology CL/CMOS LOGIC ▽ —512 | | | | | |
| Device LV/LOW Voltage ▽ —513 | | | | | |
| Process 21/LOW K Cu ▽ —515 | | | | | |

| Tech 3 Code | Tech 3 Name | Tf Code | Tech 2 Code | Status |
|---|---|---|---|---|
| CL013LV21 | 0.13UM,CMOS LOGIC Low Voltage | CLLV21 | CL013LV | A |

204a 1 records found    Query

FIG. 5

| | | |
|---|---|---|
| TLS Technotogy Query | | |
| Exit | | |

TL5 Technology Query

Query Type
  ○ Common Query  ○ Holdable Stage Query  } 708

Select Query Items

Display & Sequence                                                                      [Desc]
| Up | 1.Fab Code | > | 1.Fab Code | 6.Status | △ > | Up |
|    | 2.Tech Code | << | 2.Tech Code | 7.Geometry [um/nm] | >> |   |
|    | 3.Technology Title |  | 3.Technology Title |  |  |   |
|    | 4.Description |  | 4.Description |  |  |   |
| Dn |  |  | 5.Docu No |  |  | Dn |
} 700

Define Query Criteria

| Fab [ ▽ ] | Geometry(um/nm) [ ▽ ] | Masking Layers [ ] | Poly Mide [ ] |
|---|---|---|---|
| Tech Code [ ] | Voltage (V) [ ▽ ] | Mask Group [ ▽ ] | ESD [ ▽ ] |
| Status [ ▽ ] | Poly Gate [ ▽ ] | OPC Group [ ▽ ] | CMP [ ▽ ] |
| Category [ ▽ ] | Zero Mask [ ▽ ] | PSM Group [ ▽ ] | Cu [ ▽ ] |
| Proc Type [ ▽ ] | Poly Metal [ ▽ ] | Design Rule [ ] | RD Tech [ ] |
| TL4 Code [ ] | | | |
} 702

Technology Type          Device                              Process          Tech Func Code
[ ▽ ] > [ ▽ ] > [ ▽ ] > [ ▽ ]  } 704

Advanced Criteria

Masking Set
| Masking Code [ ▽ ] | Scribe Tone [ ▽ ] |
| Mask Usage [ ▽ ] | CKT Open [ ▽ ] |
| Mask Grade [ ▽ ] | Process Bias [ ▽ ] |

Tesr Line
| PCM [ ▽ ] | T/L Oper [ ▽ ] |
| Test Line [ ▽ ] | Seal Ring [ ▽ ] |
|  | Scribe Line Width [ ▽ ] |
} 706

Holdable stage query criterion          [ Query ]

FIG. 7

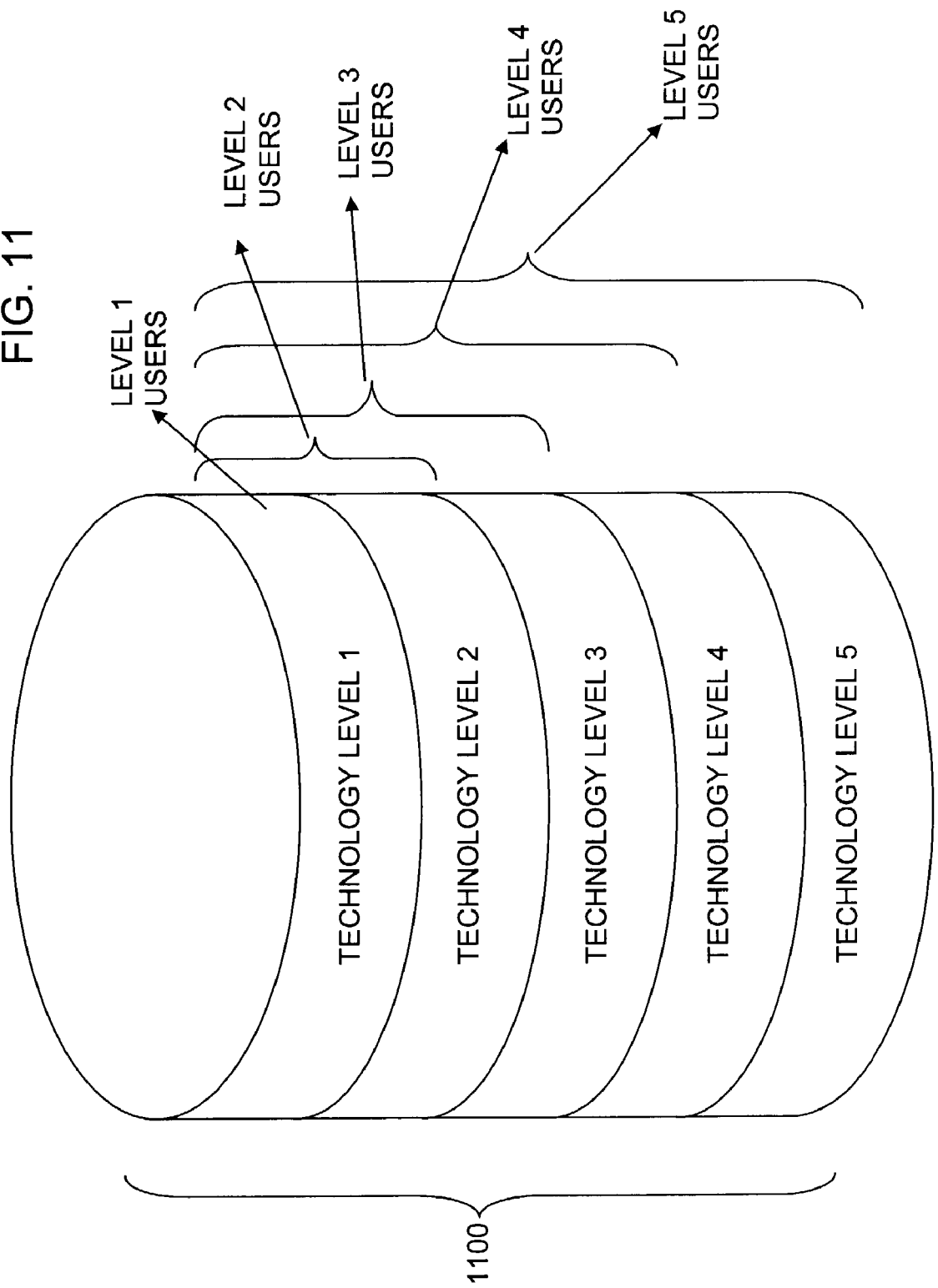

IC FOUNDRY MANUFACTURING TECHNOLOGY MASTER DATA MANAGEMENT STRUCTURE

FIELD OF THE INVENTION

The present invention relates to software generally, and more specifically to a database management structure suitable for use in an integrated circuit foundry environment.

BACKGROUND

The integrated circuit foundry business has experienced tremendous growth in recent years. To provide high productivity and responsive customer service, the various departments and groups within a foundry organization desire a logical, intuitive organization of data to enable them to quickly locate information relating to technical topics of interest.

The prior art data structure used in foundry environments required significant processing before the database could be used for long-term and mid-term forecasting. The prior art data structure included two levels: a very abstract high level, and a very detailed low level. Prior art data structures were not appropriate for enterprise supply chain management, pricing/cost maintenance, tape out services to customers, or technical document management. Prior art data structures required a high maintenance effort. Further, these data structures did not provide proper data ownership or a maintenance process.

SUMMARY OF THE INVENTION

A method for managing data in a database comprises the steps of: classifying a plurality of data in the database based on a technology type of each datum, the data in the database describing semiconductor products and semiconductor fabrication techniques; classifying the data within each technology type based on a device type of each datum; and classifying the data within each device type based on at least one processing attribute associated with the datum.

Another method for managing data in a database comprises the steps of: classifying a plurality of data in the database based on a wafer size associated with each datum, the data in the database describing at least one of the group consisting of color filter products, color filter fabrication techniques and solder bumping techniques; and classifying the data within each wafer size based on at least one of the group consisting of masking layers and fabrication specific attributes.

BRIEF DESCRIPTION OF THE DRAWINGS

FIG. 5 shows a display screen for a query corresponding to technology level 3 of FIG. 1.

FIG. 7 shows a display screen for a query corresponding to technology level 5 of FIG. 1.

FIG. 11 is a diagram showing the access to data in the various level of the database.

DETAILED DESCRIPTION

An exemplary embodiment of the invention provides a three level technology hierarchy, including: technology level, device level and process level. The data tables in the database are organized around these three levels.

Figure 1:
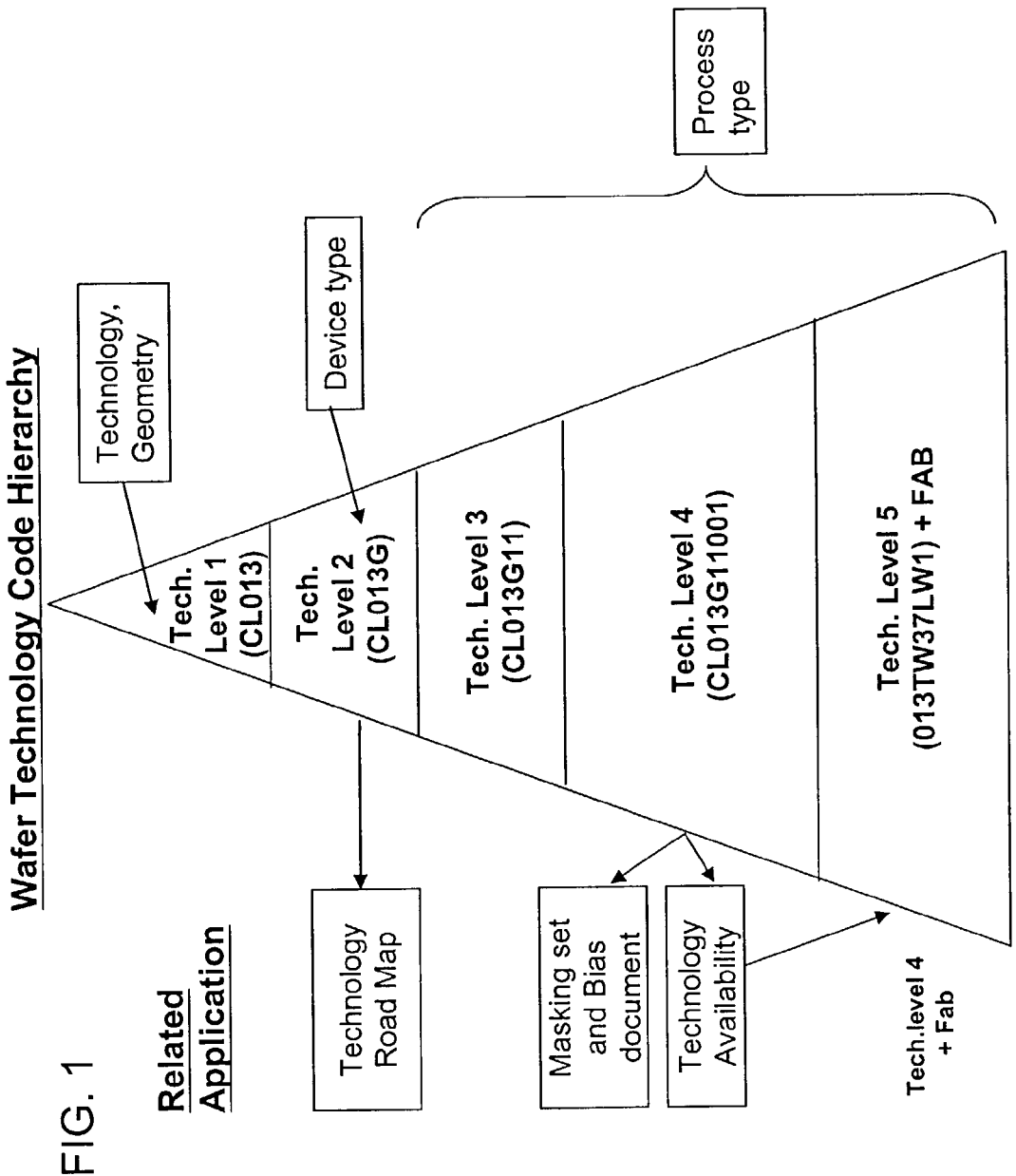
FIG. 1 is a diagram of a first embodiment of a data management hierarchy for a database.

FIG. 1 shows an example of the data structure, in which the hierarchy is represented by a triangle in the center. In the example of FIG. 1, the structure is extended by sub-dividing the process level into three sub-levels (referred to herein as technology levels three, four and five).

Table 1 provides an explanation of the wafer technology code hierarchy shown in FIG. 1. Column 1 provides the technology level. Column 2 give exemplary technology codes showing the length and format used at each technology level for an exemplary system. Column 3 identifies business needs that are served by the data that are queried at each technology level. Column 4 gives examples of the level of detail of the data that are obtained by entering queries at each technology level. Column 5 lists exemplary application programs that can send data to the database or receive data from the database at each technology level.

TABLE 1

| Technology Level | Exemplary Code | Business Needs | Level of Detail | Related Application |
|---|---|---|---|---|
| 1 | CL013 | High Level Communication, Equipment Investment, Long term demand forecast | 0.13 um, CMOS Logic | |
| 2 | CL013G | D0 Forecasting, Technology Roadmap | 0.13 um, CMOS Logic, Generic | Technology Road Map |
| 3 | CL013G11 | Mid-term Demand Forecast, Frame Cell Maintenance | 0.13 um, CMOS Logic, Generic, FSG, All copper | |

TABLE 1-continued

| Technology Level | Exemplary Code | Business Needs | Level of Detail | Related Application |
|---|---|---|---|---|
| 4 | CL013G11001 | NTO service, Pricing/One Standard Cost, IP/library, Mask quotation, Mask Forecast, Technical Document, Technology Availability, Allocation Planning, Cyber Shuttle, BOD, Billing Forecast | 0.13 um, CMOS Logic, Generic, FSG, All copper, Max. 1P8M, 1.2/3.3 V, Salicide | Provides information to Masking set, Bias document, and Technology Availability |
| 5 | 013TW37LW1 + FAB | Output Planning Communication bridge between customer and engineering, Engineering Process Flow Preparation, Fab Standard Cost | 0.13 um, CMOS Logic, Generic, FSG, All copper, 1P8M, 1.2/3.3 V, Salicide, 37 Masking Layers, Fab6 | Contains information on Technology Availability |

For each technology level, a respective technology code format and naming convention is used. One or more additional characters are added at each technology level. Alternatively stated, the number of characters in the code corresponds to the technology level. Table 1 shows an example of how the naming convention is employed at various levels of the data structure. At each technology level, technology codes are assigned with a code length corresponding to that technology level. Each character in the code is associated with a particular technology type/geometry (at technology level 1) device type (at technology level 2) and process type (in technology levels 3–5).

Figure 2:
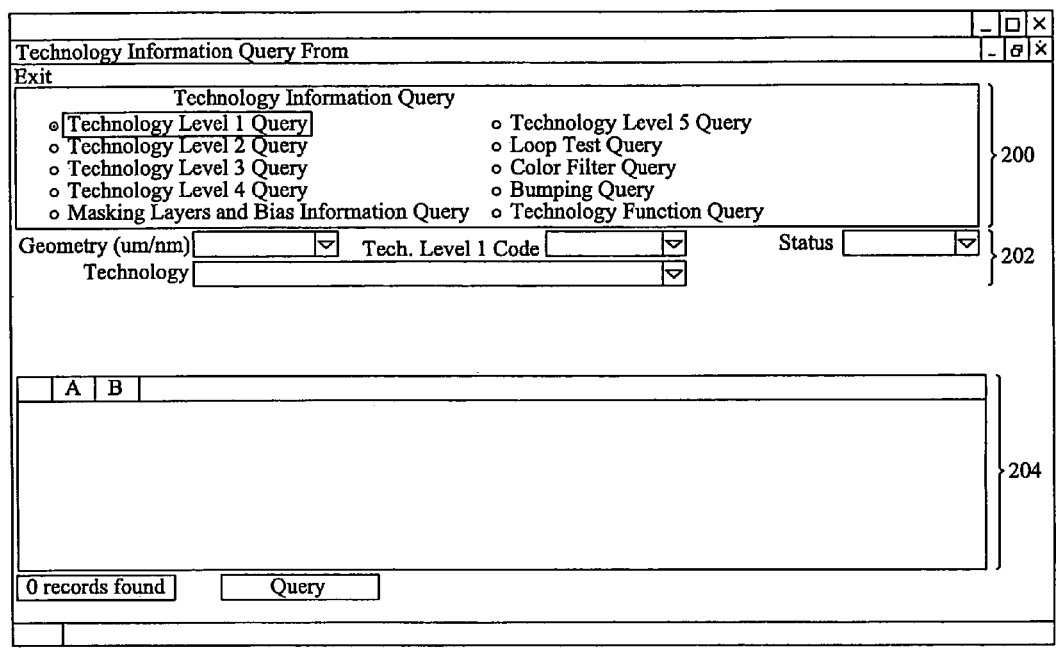
FIG. 2 shows a display screen for selecting one of the available query levels corresponding to the hierarchy levels of FIG. 1.

FIG. 2 shows an input screen for selecting a query level. The exemplary query selection screen has a plurality of "radio buttons" 200 corresponding to the optional query levels that are available. A plurality of input fields 202 allow the user to input parameters of the query. When a different radio button 200 is selected, the input fields 202 change to the set of parameters corresponding to the selected query level. A results field 204 contains a listing of all records found by the search.

Although the example of FIG. 2 uses a plurality of radio buttons, any other graphical user selection interface (e.g., pull down menus, hyperlinks or the like) may be used.

Figure 3:
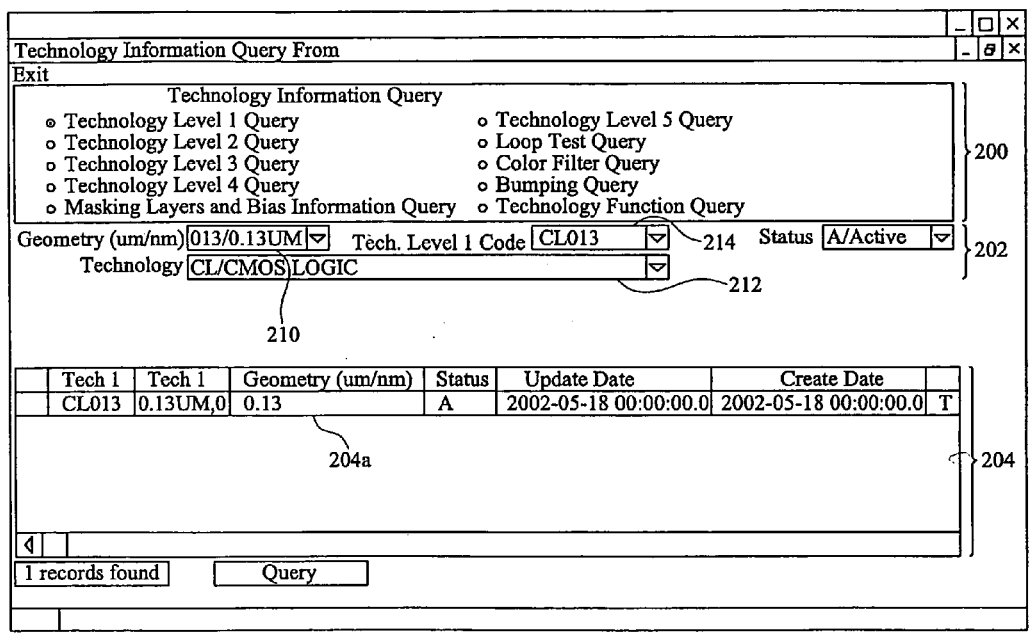
FIG. 3 shows a display screen for a query corresponding to technology level 1 of FIG. 1.

FIG. 3 shows the query screen upon execution of a technology level 1 query (technology level query). A technology type is entered in field 212. The technology level 1 encompasses broad technology types such as CMOS Logic, CMOS Mixed Signal, CMOS Standalone Memory, CMOS Embedded Memory, CMOS Image Sensor, CMOS High Voltage, CMOS Microdisplay, CMOS MEMS, BICMOS mixed signal, and BICMOS high voltage. Other high level technology types can also be added to technology level one as deemed appropriate.

In the exemplary embodiment, the geometry (minimum line width) of the integrated circuit type is a second parameter for technology level one, entered in field number 210. For example, the database may have data for 65 nanometer and 0.13 micron geometries.

The system enables a first set of users to query the database by selecting a technology type. When the first set of users access the database, they are presented an input screen, such as that shown in FIG. 3. In the example, the first set of users include at least one of the group consisting of operation efficiency personnel, research and development personnel, sales personnel, regional planning personnel and central planning personnel. In the example, the first set of users queries the database for information relating to at least one of the group consisting of high level communication, equipment investment, and long term demand forecasting (Table 1). However, for any particular system, other groups may be provided access to make technology level one queries.

In FIG. 3, the user can input geometry (e.g., 0.13 micron) in field 210 and technology (e.g., CMOS logic) in field 212, in which case the system responds with the entry for CL013 in field 214, which is the technology code associated with 0.13 micron CMOS logic. Similarly, if the user inputs the technology code CL013 in field 214, then the technology and geometry (CMOS logic, 0.13) are returned in fields 212 and 210, respectively. By double-clicking on the returned record 204*a*, the user can view the information associated with the record.

Table 2 provides the code portions associated with each type of technology at technology level one. Given these codes, one can readily determine the complete level one technology code by adding the geometry code (e.g., 013 for 0.13 micron).

TABLE 2

| Code | Technology |
|---|---|
| CL | CMOS Logic |
| CM | CMOS Mixed Signal |
| CZ | CMOS Standalone Memory |
| CE | CMOS Embedded Memory |
| CI | CMOS Image Sensor |
| CV | CMOS High Voltage |
| CY | CMOS Microdisplay |
| CS | CMOS MEMS |
| BM | BICMOS Mixed Signal |
| BV | BICMOS High Voltage |

Although the example uses two letters for the technology and three digits for the geometry, in other systems, there may be one or more than two characters for the technology, and a different number of characters for the geometry. Also in some systems, the characters representing the geometry may appear first, with the indicating the technology second.

Referring again to FIG. 1 and Table 1, technology level two adds device information to the database query capability, for classifying and querying the data within each technology type based on a device type of each datum.

In technology level two, information is classified and queried using both the technology type and device type. Exemplary device types include generic, enhanced, low voltage, high speed, low power, ultra low power, Phase-in, Legacy SRAM, DRAM, Flash, MROM, EPROM, EEPROM, logic based, LCOS, mirror, surface, bulk, Si, and SiGe.

The structure enables a second set of users to query the database by selecting a technology type and a device type. The exemplary second set of users includes at least one of the group consisting of product engineering personnel, marketing personnel and research and development personnel. The administrator at a given foundry may choose to allow other groups of users to access data using technology level two queries.

As shown in Table 1, the second set of users query the database for information relating to at least one of the group consisting of defect density (D0) forecasting developing a technology roadmap (i.e., a plan and schedule for future technology development).

Figure 4:
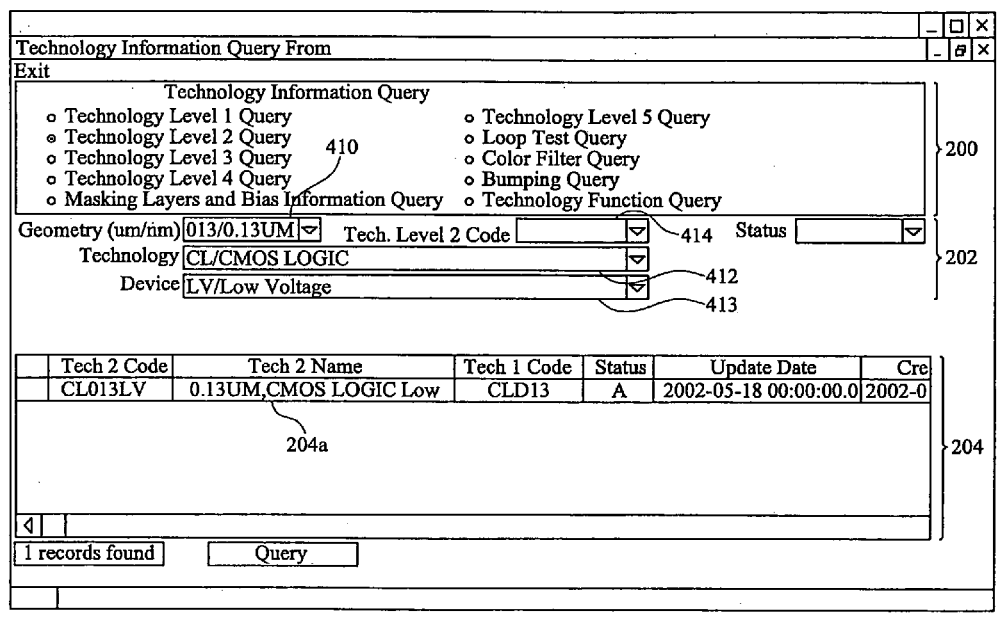
FIG. 4 shows a display screen for a query corresponding to technology level 2 of FIG. 1.

FIG. 4 is a diagram of an exemplary technology level 2 query screen that is made available to the second group of users who are enabled with technology level-2 query access, when the technology level 2 radio button is selected in field 200. The user can enter the geometry (e.g., 0.13 μm) in field 410 and/or technology (e.g., CMOS logic) in field 412 and/or device type (e.g., low voltage) in field 413 to make a query. Alternatively, the user can enter a technology level 2 technology device code (e.g., CL013LV) in field 414. The system returns a list of records 204a in field 204 that satisfy the search criteria entered.

In some systems, some (or all) of the technology level-two characters have a separate meaning related to the device type, so that technology level two is divided into two (or more) sub-levels. For Example, Table 3 lists the possible technology level-2 characters for CMOS microdisplay devices. In this example, the technology level 1 code is CY. There are two possible values for the first character of the technology level 2 code: "S" for LCOS and "R" for Mirror. If the first character is "S," the second character can be "L," "M," or "V." If the first character is R, then the second character can be A.

TABLE 3

| Technology Level (1) | | Device Level (2) | | | |
|---|---|---|---|---|---|
| digit #1–2 | code | Digit #3 | code | digit #4 | code |
| CMOS Microdisplay | CY | LCOS | S | Logic based | L |
| | | | | Mixed signal based | M |
| | | | | HV based | V |
| | | Mirror | R | Glass | A |

One of ordinary skill can readily assign codes to any device types handled by that foundry.

As in the case of technology level 1, different numbers of characters may be used for the technology level two designation. If there are very many devices, the technology level 2 code can be assigned more characters (e.g., 3 or 4 characters) to uniquely identify each device type.

Referring again to FIG. 1 and Table 1, technology levels three to five classify the data within each device type based on at least one processing attribute associated with the datum. Some embodiments have only one or two process levels, and other embodiments have more than three process levels.

Technology level 3 classifies the process as legacy, fluorinated silica glass (FSG), all copper, low k, lower k, C series, phase in product for a customer (referred to herein as, "SAC1, SAC2, SAC3"), metal-insulator-metal capacitor (MiM), poly-insulator-poly capacitor (PiP), non-PiP/MiM, or TC series.

This structure enables a third set of users to query the database by selecting at least one of the group consisting of a technology type, a device type, and at least one processing attribute. In one example, the third set of users includes at least one of the group consisting of marketing personnel, design service personnel, sales personnel, central planning personnel, regional planning personnel and operation efficiency personnel. In other embodiments, the administrator at a given foundry may choose to allow other groups of users to access data using technology level three queries.

For example, in an example in which the hierarchy has only three (not five) technology levels, the third set of users includes at least one of the group consisting of marketing personnel, design service personnel, sales personnel, central planning personnel, regional planning personnel and operation efficiency personnel, revenue planning personnel, document center personnel, engineering personnel, customer engineering personnel, multi-project wafer service personnel, technology transfer personnel, and industrial engineering personnel.

FIG. 5 shows an example of a technology level 3 input query screen that is made available to the third group of users who are enabled with technology level-3 query access when the technology level 3 radio button is selected in field 200. The user can enter the geometry (e.g., 0.13 μm) in field 510 and/or technology (e.g., CMOS logic) in field 512 and/or device type (e.g., low voltage) in field 513 and/or a process attribute in field 515 to make a query. Alternatively, the user can enter a technology level 3 technology device code (e.g., CL013LV21) in field 514. The system returns a list of records 204a in field 204 that satisfy the search criteria entered.

In the example, the third set of users query the database for information relating to at least one of the group consisting of a medium-term demand forecast and frame cell maintenance.

Referring again to FIG. 1 and Table 1, the process level is sub-divided into three technology levels, referred to as technology levels 3, 4 and 5. Technology level 4 inherits the technology function code and geometry from technology level 3, and contains technology data satisfying needs, such as common masking layers/bias, wafer/mask quotation, as well as the supply chain management (SCM) functions (Demand Planning, Allocation, Output Planning and Capacity Modeling, and the like).

Figure 6:
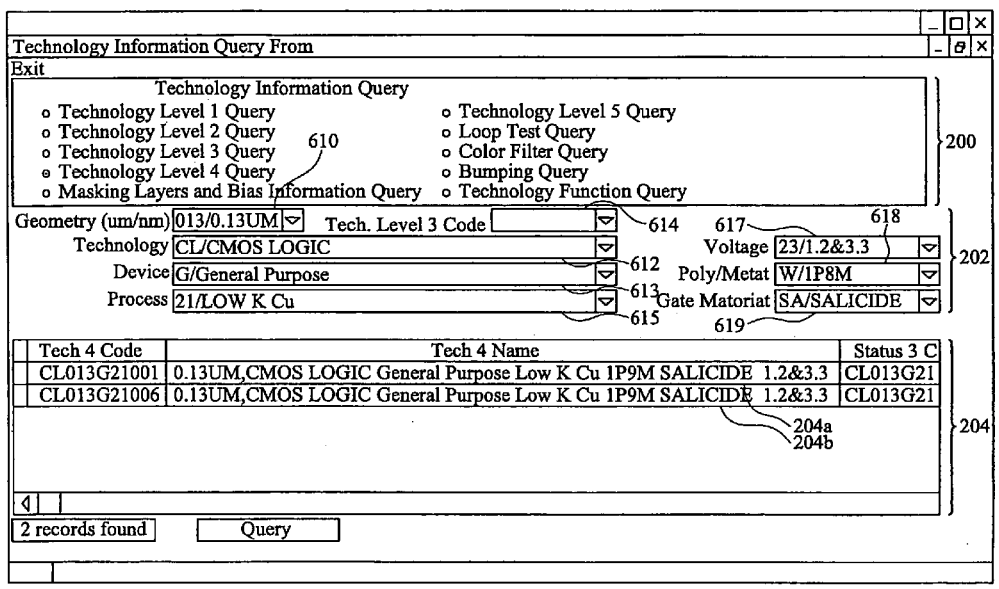
FIG. 6 shows a display screen for a query corresponding to technology level 4 of FIG. 1.

FIG. 6 shows a database query input screen corresponding to a technology level four query when the technology level 4 radio button is selected in field 200. The system enables a subset of the third set of users to query the database by entering the geometry (e.g., 0.13 μm) in field 610 and/or technology (e.g., CMOS logic) in field 612 and/or device type (e.g., low voltage) in field 613, process type in field 615 and/or by selecting such process attributes as, "low k copper," "voltage," "poly/metal," and "gate material," or a mask list from fields such as, for example, fields 617–619. Alternatively, the user can enter a technology level 4 technology device code (e.g., CL013G11001) in field 614. The system returns a list of records 204a, 204b in field 204 that satisfy the search criteria entered. FIG. 6 shows an example where the query returns more than one record.

In the exemplary embodiment, the subset of the third set of users can use the technology level 4 query capability to query the database for information relating to at least one of the group consisting of new tape out (NTO) service (Customer deliver a new product to the foundry), pricing, standard costs, intellectual property, mask list, mask forecast (number of masks needed for a technology) technical documents, technology availability at a plurality of respective fabrication facilities, allocation planning, multi-project wafer service, a billing forecast, or for providing a set of prepackaged and verified design-related documents specific to the foundry's technologies.

Referring again to FIG. 1 and Table 1, technology level 5 provides fab-specific process parameter queries into the database, for process attributes that are specific to a semiconductor fabrication facility in which the semiconductor products are made or the semiconductor fabrication techniques are performed, i.e., a semiconductor "fab".

FIG. 7 is a display of an exemplary screen for entering a technology level 5 query. The technology level 5 query screen enables the third set of users query the database for information relating to at least one of the group consisting of output planning, a communication bridge, between engineering and customer engineering, engineering process flow preparation, and fabrication facility specific standard costs.

The query screen of FIG. 7 has a query item field 700 from which the user can select a plurality of query options for input parameters to enter. Depending on the option selected, a corresponding set of input fields is displayed in field 702. These may include, for example, a fab identifier, a technology code, status, a category (e.g., generic or special technology categories), a process type, a technology level 4 code, geometry, voltage, poly gate, Alignment mask for Nikkon Stepper (zero-mask), poly/metal, masking layers, a mask group identifier, OPC group (IC layout mofication method), PSM group, design rule, polyimide, electrostatic discharge (ESD) protection, chemical mechanical polishing (CMP), copper, research and development technology, and the like.

Another option for defining the query is to enter the technology type, device type, and process type in field 704, to receive the technology function code.

Another query option is to enter advanced query criteria in field 706. These criteria may include, for example, masking set criteria, such as masking code, mask usage, mask grade, scribe tone, circuit (CKT) operation, process bias, or the like. Alternatively, a test line criterion may be entered, such as PCM, test line, test line operation, seal ring or scribe line width.

In addition, a query may be designated as a common query (available for use by general users) or a holdable stage query (to determine which process stages can be held by a customer) in field 708.

Referring again to FIG. 2, examples of other querying options include, but are not limited to: loop test query, color filter query, and bumping query. In addition, another subset of users has write access to the database. These users can select options for inputs, such as a "masking level and bias" query and/or input screen (not shown).

Figure 8A:
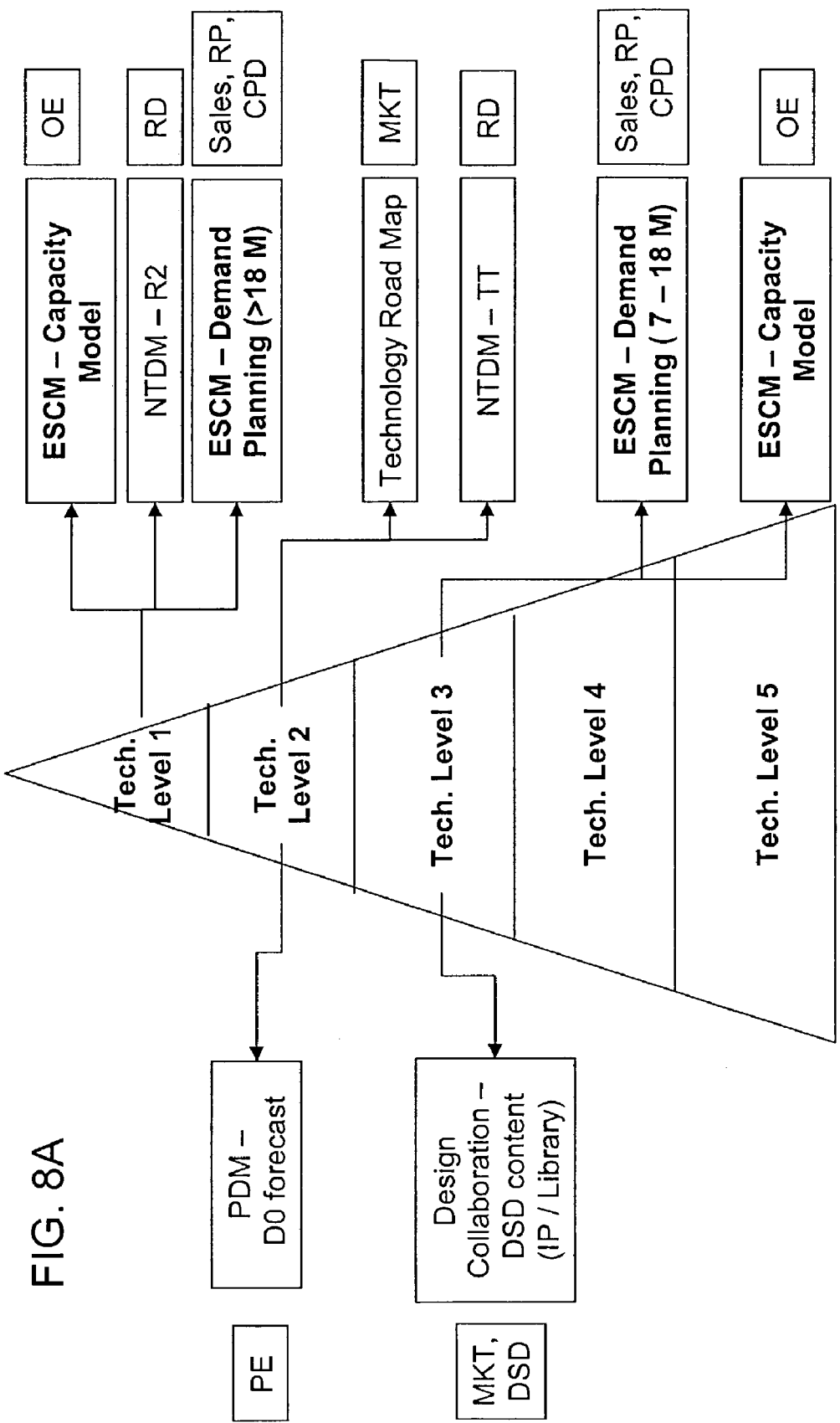
FIGS. 8A and 8B are diagrams showing how the data accessed at each level are provided to application programs.
Figure 8B:
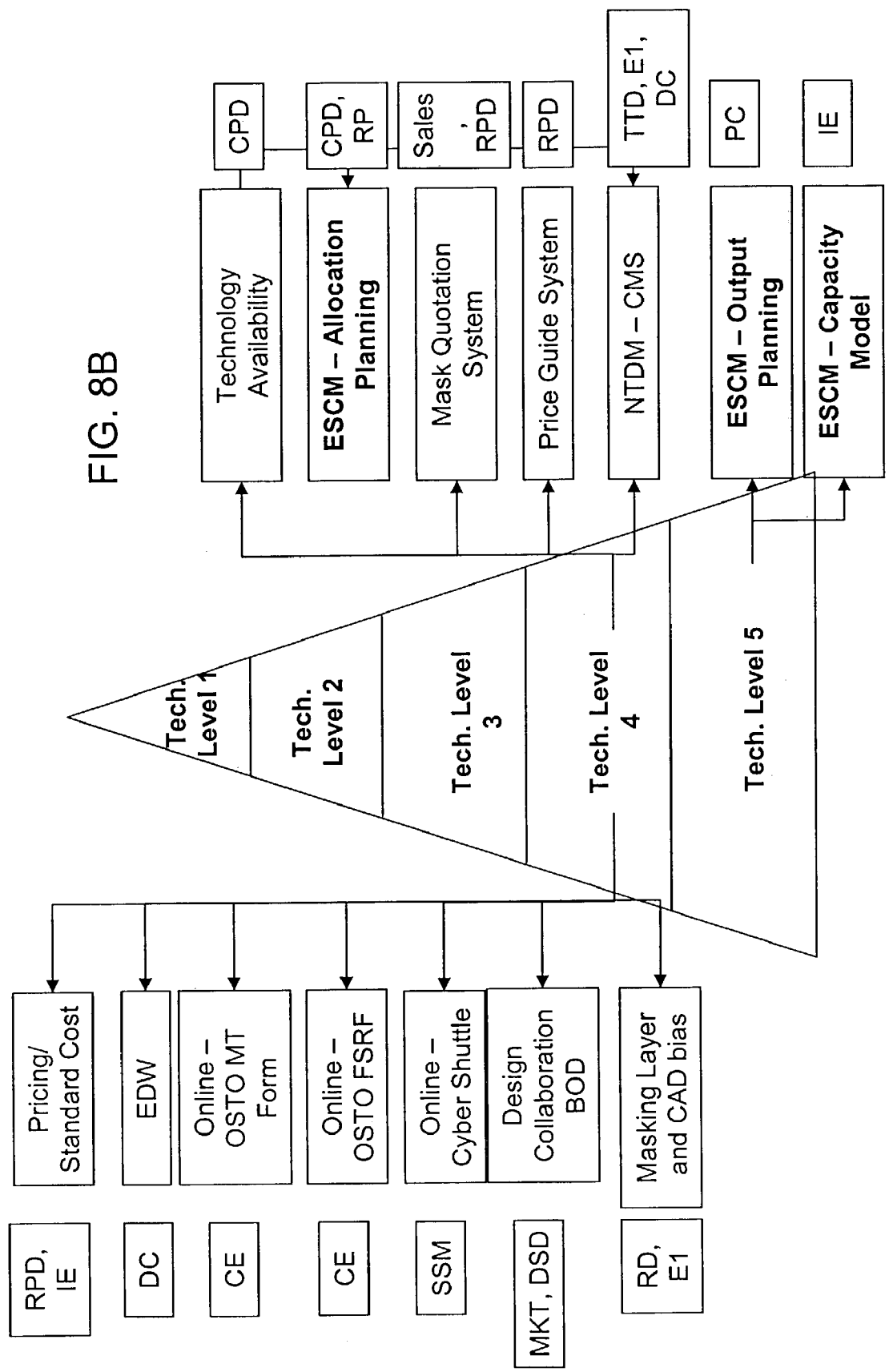

FIGS. 8A and 8B provide an example of a detailed breakdown of users and user applications which access the data in each technology level.

In FIG. 8A, at technology level 1, the data are provided to the external supply chain management (ESCM) capacity model used by the operation efficiency (OE) group, the New Technology Deployment Management—Release 2 (NTDM-R2) application used by research and development (RD), and the ESCM demand planning application used by sales, the regional planner (RP), and the central planning division (CPD).

At technology level 2, the data are used by the PDM [what is PDM?] application for a defect density (D0) forecast used by product engineering, the technology road map application used by marketing, and the New Technology Deployment Management—Technology Transfer (NTDM-TT) application used by RD.

At technology level 3, the data are used by the design collaboration—design service division (DSD) content application, and the intellectual property library application used by marketing and the design service division. The level 3 data are also used by the ESCM demand planning used by sales, RP and CPD, and the ESCM capacity model application used by OE.

In FIG. 8B, the technology level 4 data are used by a number of applications. These include a pricing/standard cost application used by the revenue planning department (RPD), the Engineer Document Workflow (EDW) application used by the document center (DC), the online One Stop Tape Out (OSTO) mask tooling (MT) form OSTO Foundry Service Request Form (FSRF) used by customer engineering, the online multiple project wafer (MPW) program used by sales/marketing (SSM), the design collaboration application used by marketing and the design service division, the masking layer and computer assisted design (CAD) bias application used by RD and engineering (E1), the technology availability application used by CPD, the mask quotation system used by sales and RPD, the price guide system used by resource planning division, and the NTDM—CMS system used by the technology transfer division (TTD), engineering, and the document center. Also, the ESCM allocation planning application used by CPD and RP indirectly receives the date from CPD and RP.

At technology level 5, the data are provided to a masking layer and CAD bias application used by RD and engineering, an ESCM output planning application used by production control, and an ESCM capacity model application used by industrial engineering.

FIG. 11 is a diagram showing a database 1100 having data divided into five portions, designated technology levels 1–5. Technology level 1 users can only access the high level, more general data in the technology level 1 tables of the database. Technology level 2 users can access the data in technology level 1 or 2 tables of the database. Technology level 3 users can access the data in technology level 1, 2 or 3 tables of the database. Technology level 4 users can access the data in technology level 1, 2, 3 or 4 tables of the database. Technology level 5 users can access the data in technology level 1–5 tables of the database.

In the example described above, the user selects the technology level at which the user wishes to query the database. In other embodiments, each user only sees a single query display corresponding to that user's respective access level, and the users are not presented the selection screen of FIG. 2. Thus, a level 1 user would only see the query screen of FIG. 3, a level 2 user would only see the query screen of FIG. 4, and so forth.

Although the example described above with reference to FIG. 1 provides five different query options corresponding to five respective technology levels, other sets of querying options may be provided.

Figure 9:
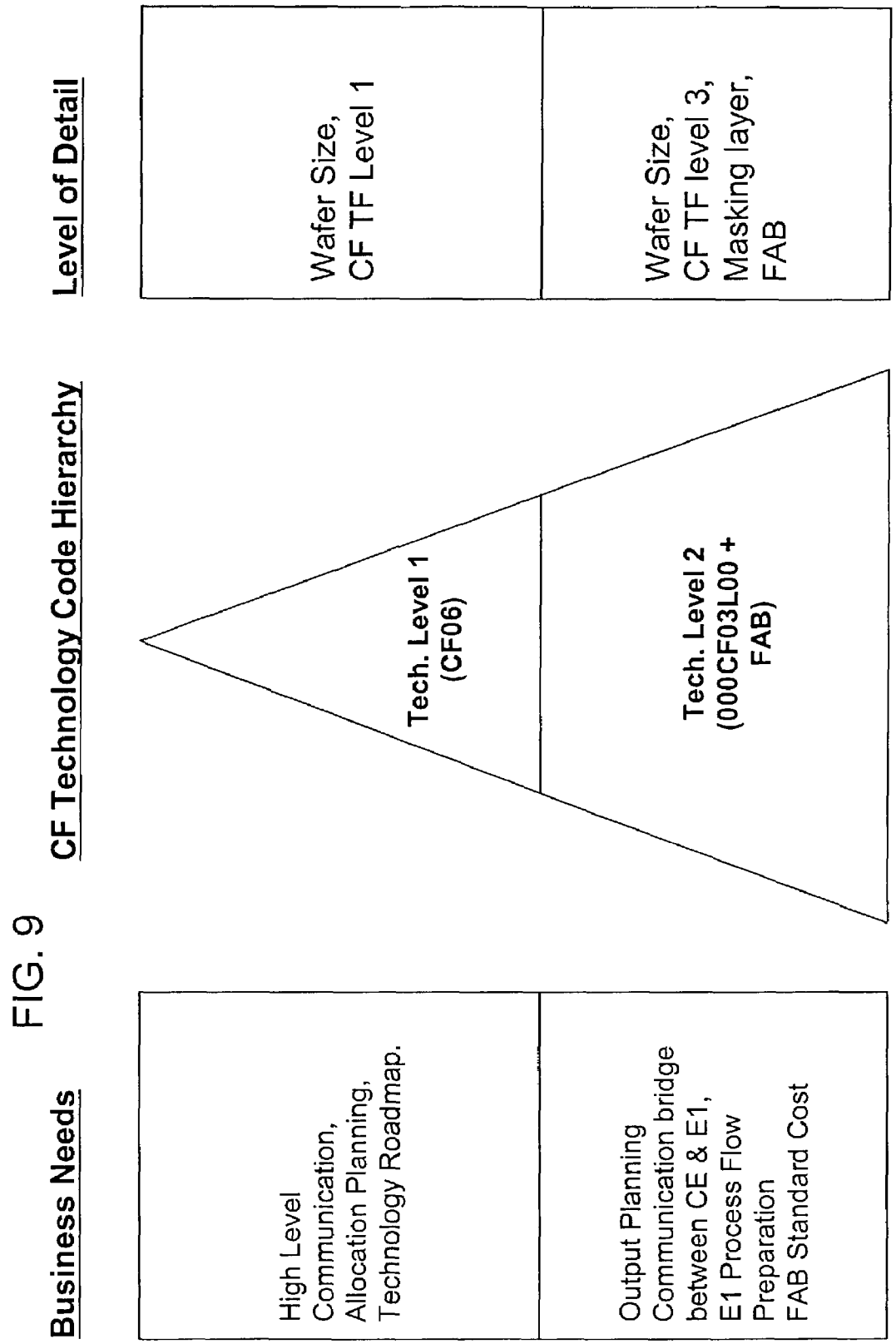
FIG. 9 is a diagram of an exemplary data management hierarchy for color filter technology.

FIG. 9 is an example of another technology hierarchy that can be used for managing data in a database containing color filter information. In the exemplary embodiment, the color filter queries are accessed by selecting the color filter radio button shown in FIG. 2.

In FIG. 9, the color filter data are arranged in a two-level hierarchy.

In color filter technology level 1, queries include features such as the wafer size. These queries are useful for high level communications, allocation planning and color filter technology roadmap.

In color filter technology level 2, queries can also include such process parameters as masking layer, or fab specific parameters. These query parameters are useful for output planning, a communication bridge between customer engineering and in-house engineering, engineering process flow preparation, determining fab standard cost and the like.

Figure 10:
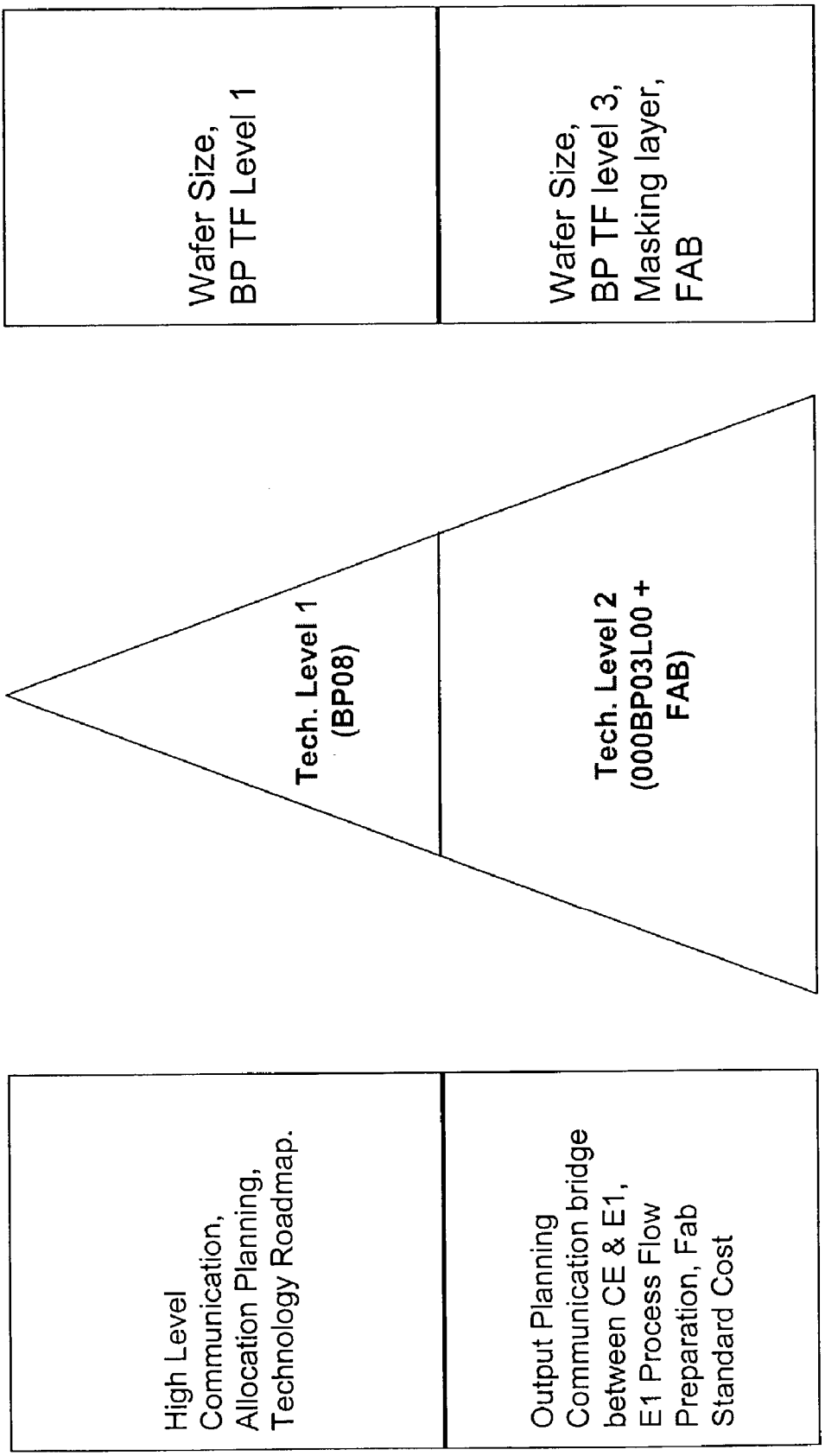
FIG. 10 is a diagram of an exemplary data management hierarchy for bumping technology.

FIG. 10 is another example of a data management hierarchy for bumping technology. In bumping technology level 1, queries include features such as the wafer size. These queries are useful for high level communications, allocation planning and bumping technology roadmap.

In bumping technology level 2, queries can also include such process parameters as masking layer, or fab specific parameters. These query parameters are useful for output planning, a communication bridge between customer engineering and in-house engineering, engineering process flow preparation, determining fab standard cost and the like.

The invention provides for querying a database. The database includes various data including but not limited to the aforedescribed data examples. The database may include various combinations of the aforedescribed data. The database may include data describing any or each of the previously described aspects such as color filter products, color filter fabrication techniques, solder bumping techniques, wafer size, process type, mask grade and so forth. In one exemplary embodiment, the data in the database may describe color filter products, color filter fabrication techniques and solder bumping techniques. The exemplary embodiments of present invention may be embodied in the form of computer-implemented processes and apparatus for practicing those processes. Other embodiments are in the form of computer program code embodied in tangible media, such as random access memory (RAM), floppy diskettes, read only memories (ROMs), CD-ROMs, DVD-ROMs, hard drives, high density (e.g., "ZIP™") removable disks, or any other computer-readable storage medium, wherein, when the computer program code is loaded into and executed by a computer, the computer becomes an apparatus for practicing the invention. Other embodiments are in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for managing data in a database, the method comprising the steps of:
   (a) classifying a plurality of data in the database based on a technology type of each datum, the data in the database describing semiconductor products and semiconductor fabrication techniques;
   (b) classifying the data within each technology type based on a device type of each said datum;
   (c) classifying the data within each device type based on at least one processing attribute associated with the datum;
   (d) enabling a user of the database to query the database by inputting the technology type, the device type, and at least one processing attribute thereby accessing the database; and
   (e) causing accessed data of the database providing at least one application program,
   each said datum of the data being classified by a code designating the technology type, the device type, and the processing attribute, the code comprising a string of characters having a length corresponding to technology level.

2. The method of claim 1, further comprising enabling a first set of users to query the database by selecting a technology type, wherein the set of users include at least one of the group consisting of operation efficiency personnel, research and development personnel, sales personnel, regional planning personnel and central planning personnel.

3. The method of claim 2, wherein the first set of users query the database for information relating to at least one of the group consisting of high level communication, equipment investment, and long term demand forecasting.

4. The method of claim 2, further comprising enabling a second set of users to query the database by selecting a technology type and a device type, the second set of users including at least one of the group consisting of product engineering personnel, marketing personnel and research and development personnel to query the database by selecting a technology type and a device type.

5. The method of claim 4, wherein the second set of users query the database for information relating to at least one of the group consisting of D0 Forecasting and developing a technology roadmap.

6. The method of claim 4, further comprising enabling a third set of users to query the database by selecting a technology type, a device type, and at least one processing attribute, the third set of users including at least one of the group consisting of marketing personnel, design service personnel, sales personnel, central planning personnel, regional planning personnel and operation efficiency personnel, revenue planning personnel, document center personnel, engineering personnel, customer engineering personnel, multi-project wafer service personnel, technology transfer personnel, and industrial engineering personnel.

7. The method of claim 6, wherein the third set of users query the database for information relating to a medium-term demand forecast.

8. The method of claim 6, wherein the third set of users query the database for information relating to at least one of the group consisting of NTO service, pricing, standard costs, intellectual property, mask list, mask forecast, technical documents, technology availability at a plurality of respective fabrication facilities, allocation planning, multi-project wafer service, BOD, and a billing forecast.

9. The method of claim 6, wherein the third set of users query the database for information relating to at least one of the group consisting of output planning, a communication bridge, between engineering and customer engineering, engineering process flow preparation, and fabrication facility specific standard costs.

10. The method of claim 1, wherein the database includes at least one datum from each of the following technology types: CMOS Logic, CMOS Mixed Signal, CMOS Standalone Memory, CMOS Embedded Memory, CMOS Image Sensor, CMOS High Voltage, CMOS Microdisplay, CMOS MEMS, BICMOS mixed signal, BICMOS high voltage, color filter and bumping.

11. The method of claim 1, wherein step (a) includes classifying each datum as having a technology type that depends on a minimum line width associated with that technology type.

12. The method of claim 1, wherein the database includes at least one datum from each of the following device types: generic, enhanced, low voltage, high speed, low power, ultra low power, Legacy SRAM, DRAM, Flash, MROM, EPROM, EEPROM, logic based, LCOS, mirror, surface, bulk, Si, SiGe, black and white, RGB, complementary.

13. The method of claim 1, wherein the database includes at least one datum for each of the following semiconductor fabrication process attributes: Voltage, Maximum Poly/Metal Layer, Gate material, and masking layers used for fabrication.

14. The method of claim 1, wherein step (c) includes further classifying each datum as having a semiconductor fabrication process attribute that is specific to a semiconductor fabrication facility in which the semiconductor products are made or the semiconductor fabrication techniques are performed.

15. The method of claim 1, each code comprising a first portion indicative of the technology type, a second portion indicative of the device type, and a third portion indicative of the at least one processing attribute; and further comprising
associating each datum in the database with a respective one of the codes corresponding to the technology type, device type and processing attribute of that datum; and
enabling a user to query the database by inputting one of the codes.

16. A method for managing data in a database, the method comprising the steps of:
(a) classifying a plurality of data in the database based on a wafer size associated with each datum, the data in the database describing color filter products, color filter fabrication techniques and solder bumping techniques; and
(b) classifying the data within each wafer size based on masking layers and semiconductor fabrication facility specific attributes
(c) enabling a user to query the database based on the wafer size, to obtain information related to one of the group consisting of high level communication, allocation planning, and a technology roadmap
(d) causing accessed data of the database providing at least one application program,
each said datum of the data being classified by a code designating the wafer size, the code comprising a string of characters having a length corresponding to technology level.

17. The method of claim 16, further comprising enabling a user to query the database based on one of the group consisting of masking layers and fabrication specific attributes, to obtain information related to one of the group consisting of fabrication facility output planning, a communication bridge between fabrication facility engineering and customer engineering, engineering process flow preparation, and fabrication facility standard cost.

18. A system for managing data in a database, comprising:
a processor for classifying a plurality of data in the database based on a technology type of each datum, the data in the database describing semiconductor products and semiconductor fabrication techniques;
means for classifying the data within each technology type based on a device type of each said datum;
means for classifying the data within each device type based on at least one processing attribute associated with the datum;
means for enabling a user of the database to query the database by inputting the technology type, the device type, and at least one processing attribute thereby accessing the database; and
means for causing accessed data of the database providing at least one application program,
each said datum of the data being classified by a code designating the technology type, the device type, and the processing attribute, the code comprising a string of characters having a length corresponding to technology level.

19. The system of claim 18, wherein the database includes at least one datum from each of the following technology types: CMOS Logic, CMOS Mixed Signal, CMOS Standalone Memory, CMOS Embedded Memory, CMOS Image Sensor, CMOS Hgh Voltage, CMOS Microdisplay, CMOS MEMS, BICMOS mixed signal, BICMOS high voltage, color filter and bumping.

20. The system of claim 18, wherein the means for classifying data based on technology classifies each datum as having a technology type that depends on a minimum line width associated with that technology type.

21. The system of claim 18, wherein the database includes at least one datum for each of the following device types: generic, enhanced, low voltage, high speed, low power, ultra low power, Legacy SRAM, DRAM, Flash, MROM, EPROM, EEPROM, logic based, LCOS, mirror, surface, bulk, Si, SiGe, black and white, RGB, complementary.

22. The system of claim 18, wherein the database includes at least one datum for each of the following semiconductor fabrication semiconductor fabrication process attributes: Voltage, Maximum Poly/Metal Layer, Gate material, and masking layers used for fabrication.

23. The system of claim 18, wherein the means for classifying data based on process attribute classifies each datum as having a semiconductor fabrication process attribute that is specific to a fabrication facility in which the semiconductor products are made or the semiconductor fabrication techniques are performed.

24. The system of claim 18, each code comprising a first portion indicative of the technology type, a second portion indicative of the device type, and a third portion indicative of the at least one processing attribute; and further comprising
means for associating each datum in the database with a respective one of the codes corresponding to the technology type, device type and processing attribute of that datum; and means for enabling a user to query the database by inputting one of the codes.

25. A computer readable storage medium encoded with computer program code, wherein, when the computer program code is executed by a processor, the processor performs a method for managing data in a database, the method comprising the steps of:
  (a) classifying a plurality of data in the database based on a technology type of each datum, the data in the database describing semiconductor products and semiconductor fabrication techniques;
  (b) classifying the data within each technology type based on a device type of each said datum;
  (c) classifying the data within each device type based on at least one processing attribute associated with the datum;
  (d) enabling a user of the database to query the database by inputting the technology type, the device type, and at least one processing attribute thereby accessing the database; and
  (e) causing accessed data of the database providing at least one application program,
  each said datum of the data being classified by a code designating the technology type, the device type, and the processing attribute, the code comprising a string of characters having a length corresponding to technology level.

26. The computer readable medium of claim 25, wherein the database includes at least one datum from each of the following technology types: CMOS Logic, CMOS Mixed Signal, CMOS Standalone Memory, CMOS Embedded Memory, CMOS Image Sensor, CMOS High Voltage, CMOS Microdisplay, CMOS MEMS, BICMOS mixed signal, BICMOS high voltage, color filter and bumping.

27. The computer readable medium of claim 25, wherein step (a) includes classifying each datum as having a technology type that depends on a minimum line width associated with that technology type.

28. The computer readable medium of claim 25, wherein the database includes at least one datum from each of the following device types: generic, enhanced, low voltage, high speed, low power, ultra low power, Legacy SRAM, DRAM, Flash, MROM, EPROM, EEPROM, logic based, LCOS, mirror, surface, bulk, Si, SiGe, black and white, RGB, complementary.

29. The computer readable medium of claim 25, wherein the database includes at least one datum for each of the following semiconductor fabrication semiconductor fabrication process attributes: Voltage, Maximum Poly/Metal Layer, Gate material, and masking layers used for fabrication.

30. The computer readable medium of claim 25, wherein step (c) includes further classifying each datum as having a semiconductor fabrication process attribute that is specific to a fabrication facility in which the semiconductor products are made or the semiconductor fabrication techniques are performed.

31. The computer readable medium of claim 25, wherein each code comprising a first portion indicative of the technology type, a second portion indicative of the device type, and a third portion indicative of the at least one processing attribute; and wherein the method further comprises
  associating each datum in the database with a respective one of the codes corresponding to the technology type, device type and processing attribute of that datum; and
  enabling a user to query the database by inputting one of the codes.

* * * * *

UNITED STATES PATENT AND TRADEMARK OFFICE
CERTIFICATE OF CORRECTION

PATENT NO. : 7,185,009 B2
APPLICATION NO. : 10/403875
DATED : February 27, 2007
INVENTOR(S) : Hwa-Yu Yang and Shu-Ling Feng It is certified that error appears in the above-identified patent and that said Letters Patent is hereby corrected as shown below:

Column 11, line 53, delete "and".

Column 11, line 60, after "roadmap" insert -- and --.

Column 12, line 34, delete "Hgh" and insert therefore -- High --.

Column 13, line 28, after "readable" insert -- storage --.

Column 13, line 35, after "readable" insert -- storage --.

Column 14, line 3, after "readable" insert -- storage --.

Column 14, line 10, after "readable" insert -- storage --.

Column 14, line 18, after "readable" insert -- storage --.

Column 14, line 22, after "readable" insert -- storage --.

Signed and Sealed this

Thirty-first Day of July, 2007

JON W. DUDAS
*Director of the United States Patent and Trademark Office*